(12) United States Patent
Hufford

(10) Patent No.: US 6,460,680 B1
(45) Date of Patent: Oct. 8, 2002

(54) DIVERTER ASSEMBLY FOR USE WITH A VIBRATORY CONVEYOR

(75) Inventor: David W. Hufford, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 57 days.

(21) Appl. No.: 09/696,808

(22) Filed: Oct. 25, 2000

(51) Int. Cl.⁷ .............................................. B65G 37/00
(52) U.S. Cl. ........................................ 198/367; 198/442
(58) Field of Search .................................. 198/367, 442, 198/551, 456, 890, 348, 766, 763

(56) References Cited

U.S. PATENT DOCUMENTS

| | | | |
|---|---|---|---|
| 4,313,535 A | * 2/1982 | Carmichael | 198/766 |
| 4,793,196 A | 12/1988 | Davis et al. | 74/61 |
| 5,174,430 A | * 12/1992 | Ebina | 198/442 |
| 5,787,679 A | * 8/1998 | Lynch et al. | 198/367 |

* cited by examiner

Primary Examiner—Kenneth W. Noland
(74) Attorney, Agent, or Firm—Wells St. John P.S.

(57) ABSTRACT

A diverter assembly for use with a vibratory conveyor having a product transporting bed is described and which includes a conveyor frame positioned in spaced relation relative to the product transporting bed; a drive assembly borne by the frame; and a product engaging member mounted in forced receiving relation relative to the drive assembly and movable along a given path of travel relative to the product transporting bed.

37 Claims, 8 Drawing Sheets

DIVERTER ASSEMBLY FOR USE WITH A VIBRATORY CONVEYOR

TECHNICAL FIELD

The present invention relates to a diverter assembly for use with a vibratory conveyor having a product transporting bed, and more specifically to a diverter assembly which can be selectively adjusted to divert products moving along the product transporting bed into various courses of travel.

BACKGROUND OF THE INVENTION

Excited frame vibratory conveying devices are known in the art. For example, U.S. Pat. No. 4,313,535, which is incorporated by reference herein shows a typical excited frame conveying apparatus. As best seen in FIG. 1, which shows a prior art device, an apparatus such as this includes a vibratory drive mounted on an elongated frame, and which rests on a floor or other supporting structure. Extending upwardly from the frame, and inclined in the direction of the intake, or infeed end of the conveyor are a plurality of leaf springs. An elongated conveyor or product transporting bed is mounted on the distal ends of each of the leaf spring, and is supported by them in a generally parallel relationship relative to the frame, and in a substantially overall horizontal orientation. Due to the resiliency of the respective leaf springs, the product conveying bed is capable of moving relative to this frame in response to a force supplied to the bed by the vibratory drive. During the operation of the apparatus, the vibratory drive produces an oscillating vibratory force which is generated by counter rotating eccentric weights which are subcomponents of the vibratory drive. Because the vibratory drive is mounted on the frame, it imparts vibratory motion to the frame, which is then transferred through the leaf springs to the conveyor bed. As a result, the bed vibrates at substantially the same frequency as the drive and frame.

In operation, if the conveyor bed is displaced from its "at rest" position and then allowed to oscillate freely, it will oscillate at its natural or "harmonic frequency". This natural frequency of the bed is dependent upon the combined spring constant, the number of springs supporting the bed, as well as the mass of the bed.

As compared with other types of vibratory conveyors, as a general matter, less vibrational and force is transferred to the floor or other supporting structure by an excited frame conveyor design because of its relatively lightweight, and small vibrational amplitude of the frame, as compared to the vibrational amplitude of the product conveying bed. The low level of vibrational force transferred to the surrounding structure is a chief advantage of the excited frame vibratory conveyor as seen in FIG. 1.

While vibratory conveyors have gained increasing acceptance, and are widely used in many industry segments, operators of such devices have sought means to make such conveyors as versatile as possible. For example, operators want this style of conveyor to be capable of handling a wide array of products at different conveying speeds. Still further, operators of such devices often want to control both the frequency of the vibration, and the amplitude of vibration of the bed, in order to control the conveying speed of the product and to minimize damage to fragile products. Still further, operators may wish to operate this conveyor in combination with other sorting devices, or otherwise integrate it with other processing machinery to widen the range of applications for which these same conveyors may find usefulness.

A diverter assembly for use with a vibratory conveyor as discussed above, is the subject matter of the present application.

BRIEF DESCRIPTION OF THE DRAWINGS

Preferred embodiments of the invention are described below with reference to the following accompanying drawings.

SUMMARY OF THE INVENTION

Figure 1:
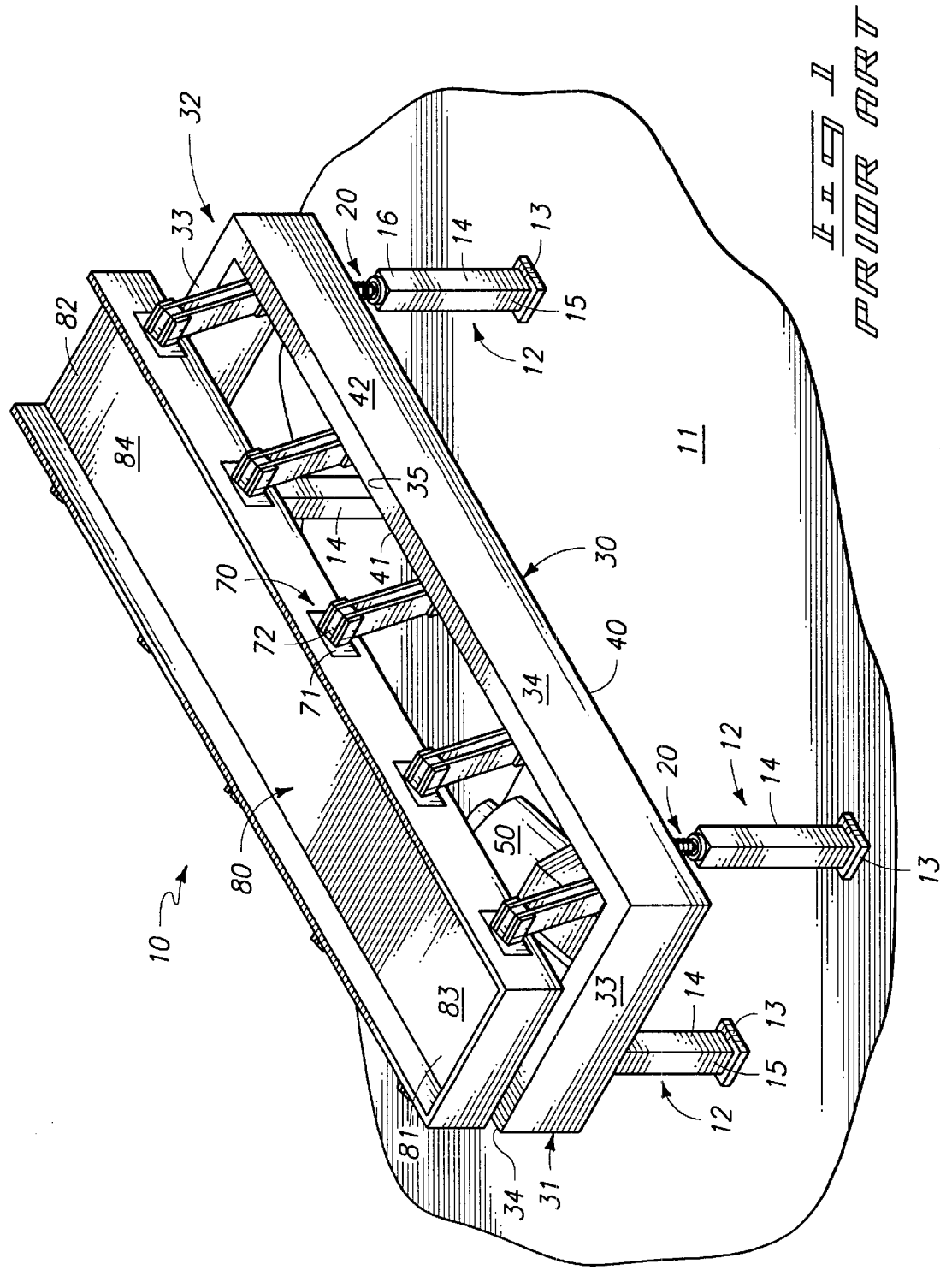
FIG. 1 is a perspective view of a prior art vibratory conveyor apparatus.

A first aspect of the present invention relates to a diverter assembly for use with a vibratory conveyor having a product transporting bed comprising a conveyor frame positioned in spaced relation relative to the product transporting bed; a drive assembly borne by the frame; and a product engaging member mounted in forced receiving relation relative to the drive assembly and moveable along a given path of travel relative to the product transporting bed.

Still another aspect of the present invention relates to a diverter assembly for use with a vibratory conveyor and which includes a product transporting bed having a first infeed end, and a second discharge end, and wherein the product transporting bed repeatedly moves in a forward and upward direction to convey a product supported on the product transporting bed from the infeed end to the discharge end thereof; a drive assembly positioned in spaced relation above the product transporting bed, the drive assembly moving in a reciprocal first path of travel; a coupler mounted on the drive assembly and depending downwardly therefrom, the coupler moving in substantial unison with the drive assembly; and a product engaging member having opposite first and second ends, and which is disposed in force receiving relation relative to the coupler, and wherein the first end of the product engaging member is pivotally mounted on the product transporting bed, and the second end, under the influence of the drive assembly, moves along at arcuately shaped path of travel over the product transporting bed.

Yet still another aspect of the present invention relates to a diverter assembly for use with a vibratory conveyor which comprises a product transporting bed having a first infeed end, and a second discharge end, and wherein the product transporting bed repeatedly moves in a forward and upward direction to convey a product supported on the product transporting bed from the infeed end to the discharge end thereof, and wherein the product transporting bed has a longitudinal line of reference which extends between the first and second ends thereof, and wherein the product transporting bed further defines a product ejecting aperture which is located intermediate the first and second ends; a drive assembly positioned in spaced relation above the product transporting bed, the drive assembly moving in a reciprocal first path of travel, and wherein the drive assembly is mounted substantially transversely relative to the longitudinal line of reference, and intermediate the first and second ends of the product transporting bed; a coupler mounted on the drive assembly and depending downwardly therefrom, the coupler moving in substantial unison with the drive assembly, and wherein the coupler includes a support member having a pair of spaced, depending legs, and wherein the coupler further has a deformable member which is mounted on and extends between the pair of spaced depending legs; a product engaging member having opposite first and second ends, and which is disposed in force receiving relation relative to the deformable member which is borne by the coupler, and wherein the first end of the product engaging member is pivotally mounted on the product transporting bed, and the second end, under the influence of the drive assembly, moves along an arcuately shaped second path of travel over the product transporting bed, and wherein the arcuately shaped path of travel of the product engaging member is defined between a first position and a second position, and wherein the product engaging member, when located in the first position, substantially prohibits access to the product ejecting aperture; a restraining assembly positioned in spaced relation relative to the product transporting bed, and further disposed in spaced relation relative to the drive assembly, and intermediate the drive assembly and the first end of the product transporting bed, and wherein the product engaging member slidably rests in contact with the restraining assembly and wherein the restraining assembly substantially supports the product engaging member in a given position relative to the product transporting bed as it reciprocally moves between the first and second positions along the arcuately shaped second path of travel; and an actuator coupled in controlling relation relative to the drive assembly for selectively locating the product engaging member along the second arcuately shaped path of travel.

These and other aspects of the present invention will be discussed hereinafter.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 2:
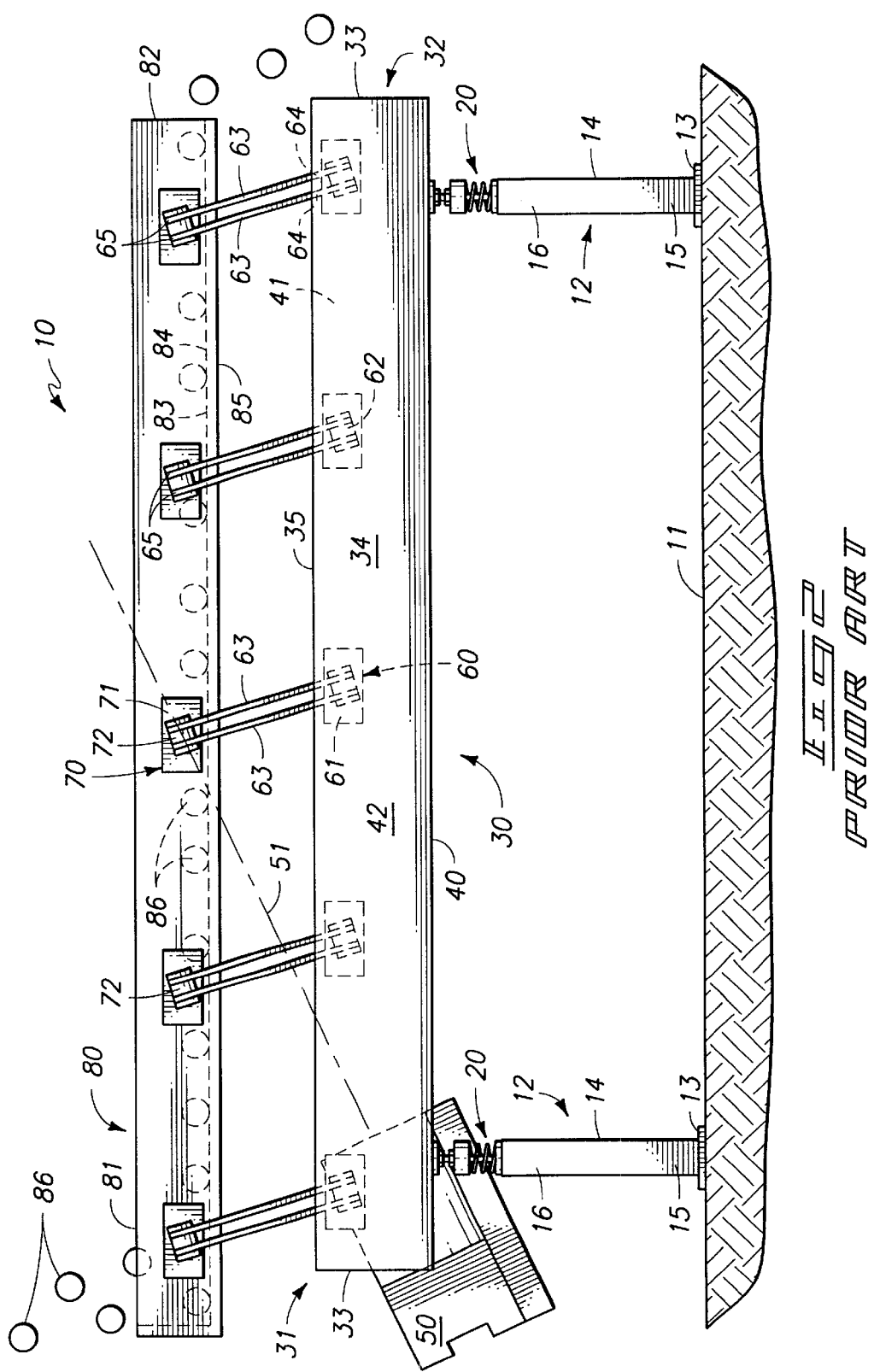
FIG. 2 is a side elevation view of the prior art vibratory conveyor apparatus as seen in FIG. 1.
Figure 3:
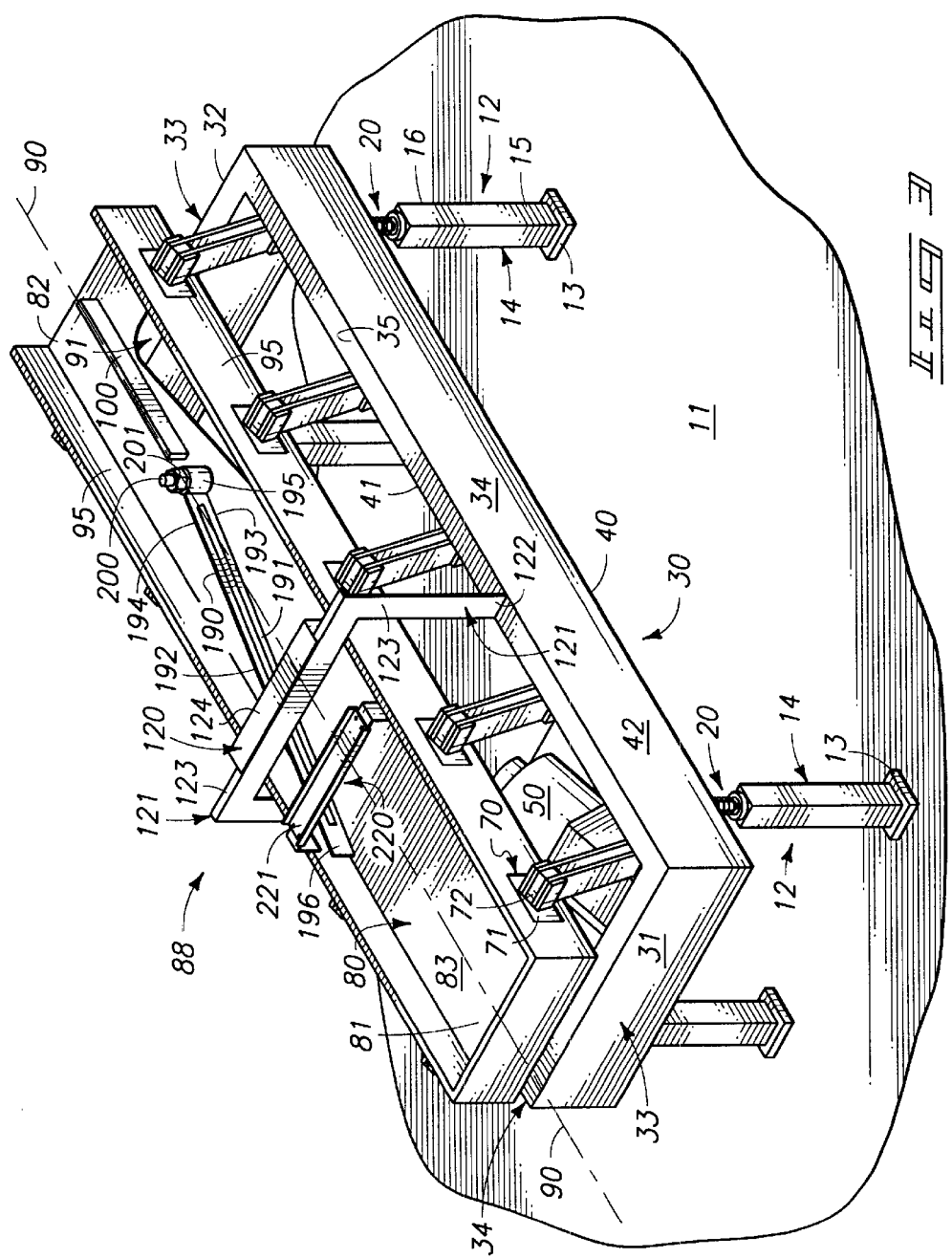
FIG. 3 is a perspective view of the present invention.
Figure 5:
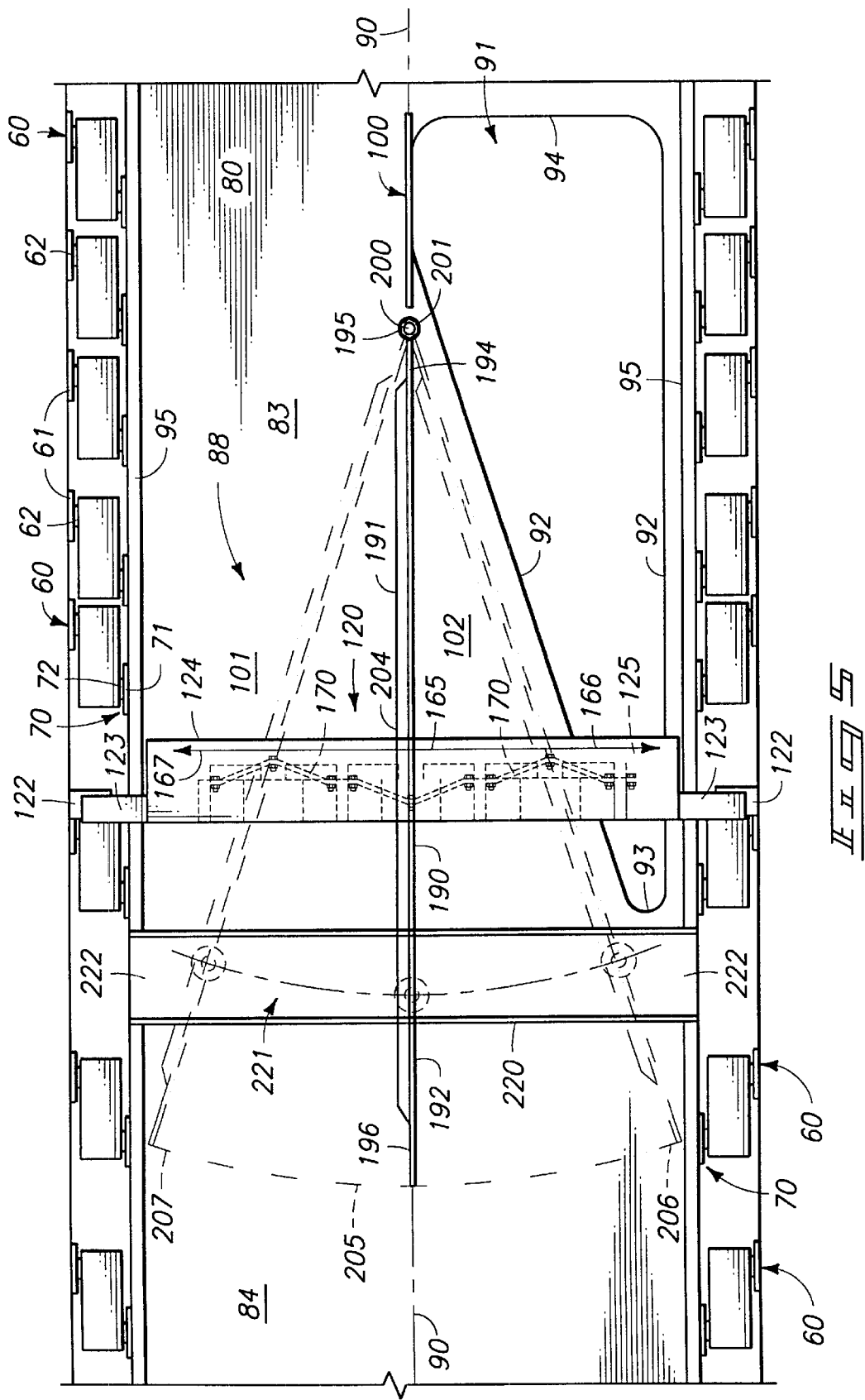
FIG. 5 is a partial, plan view of the subject invention with a product engaging member shown in various positions in phantom lines.

The diverter assembly for use with a vibratory conveyor of the present invention is best understood by a study of FIGS. 3 and 5. Referring now to FIGS. 1 and 2, a prior art excited frame vibratory conveyor of conventional design and which is fabricated in accordance with the teachings of the patent, earlier discussed, is shown. The prior art conveyor, which is generally indicated by the numeral 10, is shown resting on the surface of the earth 11 by supporting legs which are generally indicated by the numeral 12. The supporting legs include a base member 13 which rests on the surface of the earth, and a leg portion 14, which extends substantially normally upwardly a given distance therefrom. The leg portion 14 has first end 15, which is affixed to the base member 13, and an opposite, distal, second end 16 which is remote thereto. Mounted on the second end of each of the supporting legs 12, is a vibration isolating spring assembly generally indicated by the numeral 20. Affixed to the vibration isolating spring assembly 20, is a substantially rectangular frame 30. The frame has a first end 31, and an opposite second end 32. The frame includes opposite end portions 33; and opposite side portions 34, which are coupled or affixed to the opposite end portions 33. Each of the side portions 34 have a top edge 35, bottom edge 40, an inwardly facing surface 41, and an outwardly facing surface 42.

As seen in FIGS. 1 and 2, the vibratory conveyor of the prior art 10 includes a vibratory drive 50 which is borne by the frame 30, and which is operable to impart vibratory motion to the frame. The vibratory motion is directed along the line of force which is generally designated by the numeral 51 as seen in FIG. 2. The vibratory drive used in the prior art conveyor was described in significant detail in U.S. Pat. No. 4,793,196, which is incorporated by reference herein. The vibratory drive, as used in the present invention, includes a variable speed motor which allows the frequency of the vibratory drive to be dynamically changed. Variable speed motors are well known to those skilled in the art.

As best seen in FIGS. 1, 2 and following, a plurality of lower mounting fixtures generally designated by the numeral 60 are affixed by welding, or suitable fasteners, to the inside facing surface 41 of each of the opposite side portions 34. These lower mounting fixtures are mounted in predetermined, substantially equally spaced locations along each of the opposite side portions 34. Each of the lower mounting fixtures 60 have a base plate 61, which is affixed to the inside facing surface 41. This can be accomplished by welding or other suitable fasteners as indicated above. Still further, a post 62 is mounted to or otherwise made integral with the base plate 61 and extends substantially normally outwardly therefrom. The post 62 has apertures formed therein, (not shown). As seen in FIGS. 1, 2 and following, the vibratory conveyor of the prior art 10 includes a pair of resilient members or leaf springs generally indicated by the numeral 63. These leaf springs are well understood in the art, and are fabricated from various resilient materials appropriate for the product conveying or transporting bed which is supported by same. The product transporting bed will be discussed in further detail hereinafter. As seen in the drawings, each pair of leaf springs have respective first ends 64, and opposite distal or second ends 65. As best appreciated by a study of FIG. 2, the proximal or first ends 64 are affixed by a pair of fasteners (not shown) which are received through the individual leaf springs 63 and which further pass through the lower mounting fixture 60 by way of the apertures formed in same (not shown).

As seen by reference to FIGS. 1, 2 and following, the vibratory conveyor of the prior art 10 also includes upper mounting fixtures 70, which have an overall design which is substantially similar to that of the lower mounting fixtures 60. The upper mounting fixtures include a base plate 71, and a post 72 which is affixed thereto. In a fashion similar to that previously discussed with respect to the lower mounting fixture 60, apertures, not shown, are formed in the post 72, and suitable fasteners are received through the distal ends 65 of each of the leaf springs and through the apertures formed in the post 72, thereby securing the distal ends of each of the leaf springs to the upper mounting fixtures 70. As should be understood, the plurality of leaf springs or resilient members which are borne by the frame, each have a predetermined spring constant, and range of motion. This range of motion allows a product transporting bed, which will be discussed hereinafter, to repeatedly move in a forward and upward direction to convey a product supported thereon from the infeed or first end, to the discharge or second end thereof. As discussed earlier, vibratory motion imparted to the frame 30 is transmitted to the resilient members 63 which are borne by the frame to cause the resilient members 63 to move within their given range of motion.

As best seen by references to FIGS. 1, and 2, the vibratory conveyor of the prior art 10, includes a conveyor or product transporting bed generally indicated by the numeral 80, and which is mounted on or borne by each of the pairs of resilient members or leaf springs 63. The conveyor or product transporting bed 80 is of substantially conventional design, as shown in FIGS. 1 and 2, having a first or infeed end 81, and an opposite, second or discharge end 82. The product transporting bed defines a supporting surface 83 having an uppermost or top surface 84, and a lowermost or bottom surface 85. As seen in FIG. 2, the top of uppermost surface 84 supports a product 86 which travels therealong to the discharge end 82 for further processing by other equipment, not shown. While the product is shown generally as having a round spherical configuration, it will be recognized that products of varying shapes may be utilized with a conveyor of this design. For example, this style of conveyor has found usefulness in transporting all manner of food products.

Referring now to FIG. 5, which shows a fragmentary, plan view of the diverter assembly 88 of the present invention, it will be seen that the conveyor or product transporting bed 80 has many of the features as earlier discussed with respect to the prior art, however there are several noteworthy differences. For example, the product transporting bed 80 is further defined by a longitudinal line of reference 90, which extends between infeed and discharge ends 81 and 82, respectively. Still further, and as seen in FIG. 5, an elongated product ejecting aperture 91, having a given length and width dimension, is formed in the supporting surface 83 of the product transporting bed 80. The product ejecting aperture which is located in laterally offset relation relative to the longitudinal line of reference 90 is defined by a peripheral edge 92. The product ejecting aperture has an apex 93, and a base portion 94. As seen in FIG. 5, the product ejecting aperture roughly appears as a right triangle with the aperture increasing in the width dimension when measured from the apex 93 to the base portion 94 thereof. As shown, the apex 93 is closest to the infeed end 81, and the base portion is closest to the discharge end 82 of the product transporting bed 80. The conveyor or product transporting bed 80 further has a pair of sidewalls 95 which are mounted along the peripheral edge of the supporting surface 83. The pair of sidewalls have an inside facing surface 96 which confines the product 86 traveling along the product transporting bed 80 therebetween. As further seen in FIG. 5, a dividing or channel sidewall 100 is positioned substantially along the longitudinal line of reference 90, and extends from a position beginning intermediate the infeed and discharge ends 81 and 82, and extending in the direction of the discharge end 82. The channel sidewall 100 which extends substantially normally upwardly relative to the supporting surface 83 defines a first channel 101 and a second channel 102, respectively. As seen in FIG. 5, the product ejecting aperture 91, in the area of the base portion thereof 94, substantially extends across the second channel 102.

A drive assembly generally indicated by the numeral 120 is borne by the frame 30. In this regard, the drive assembly 120 is positioned in spaced relation above the product transporting bed 80, and is operable to move along a reciprocal first path of travel which will be discussed hereinafter. Still further, and as illustrated in FIG. 3, the drive assembly is mounted substantially transversely relative to the longitudinal line of reference 90, and intermediate the first and second ends 81 and 82 of the product transporting bed. The drive assembly 120 includes a pair of support members 121 which are affixed by welding, or other suitable fastening techniques, to the frame 30. In this arrangement, little, if any, vibration from vibrating bed 80 is transmitted to the drive assembly 120. Still further, it is conceivable that the support members could rest on the surface of the earth 11, or in the alternative, be mounted on and suspend downwardly from an overhead ceiling or mezzanine (not shown).

This aspect of the invention is noteworthy inasmuch as an alternative arrangement, such as mounting the drive assembly 120 directly on product transporting bed would potentially change the center of mass of the product transporting bed 80. As earlier discussed, a change in the center of mass of the product transporting bed would require a substantial realignment of the vibratory drive 50 and the new center of mass of the product transporting bed. In the current arrangement, no alteration in the center of mass occurs, and therefore, no alteration to the vibratory drive is required. Yet further, operators of such vibratory conveying devices may utilize the present apparatus in the manner of a retrofit, on existing machines, without substantially changing the machine, or the way in which it is operated.

Figure 4:
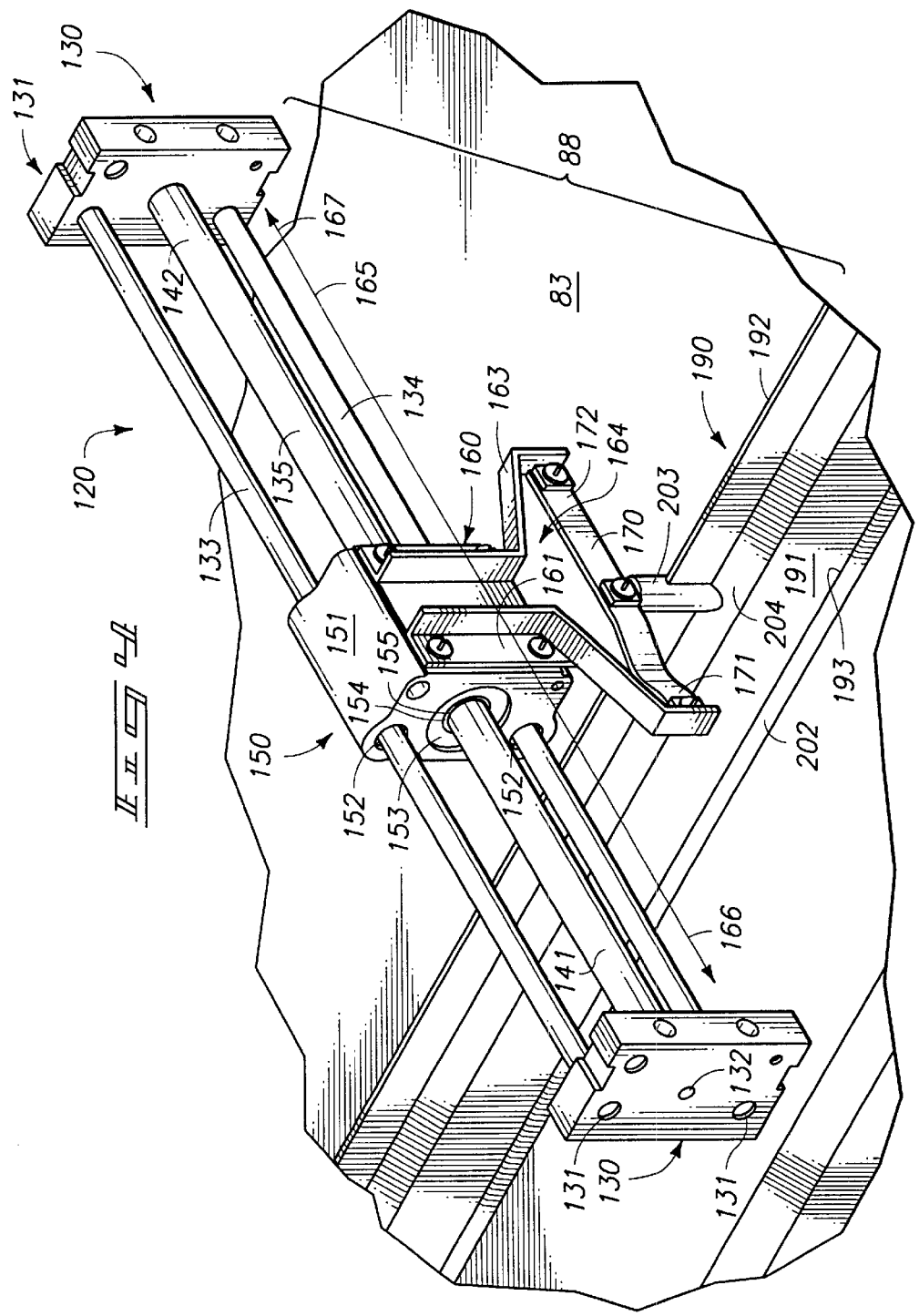
FIG. 4 is a perspective, fragmentary view of the drive assembly utilized with the present invention, with some supporting surfaces removed to show the structure thereunder.
Figure 6:
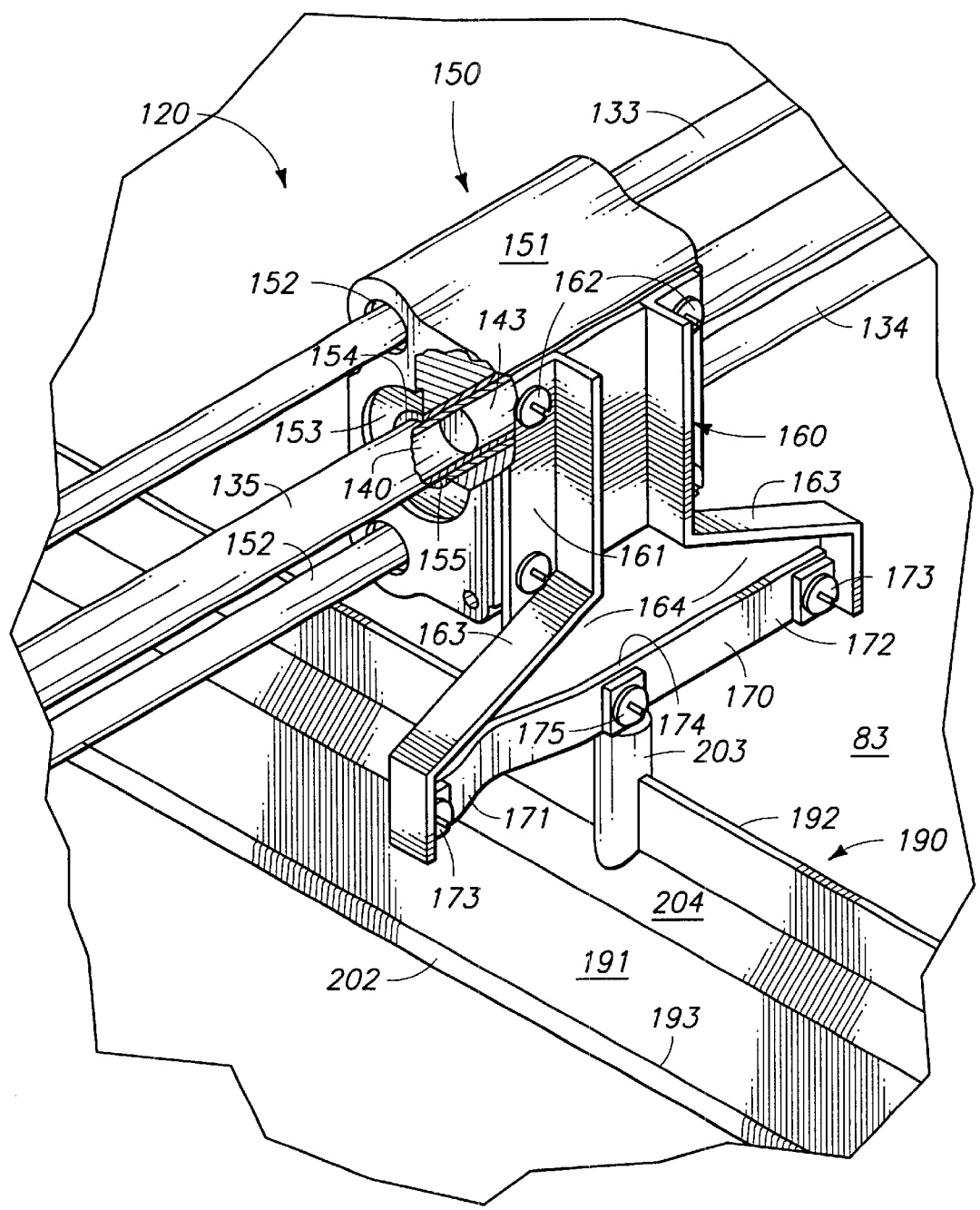
FIG. 6 is a greatly enlarged, fragmentary, perspective view of the drive assembly shown in FIG. 4, with some supporting surfaces removed to show the structure thereunder.

The respective support members 121 have a first end 122, which is affixed on the frame, and an opposite second or distal end 123 which is positioned in spaced relation relative to the product transporting bed 80. As seen by reference to FIGS. 3 and 5, an enclosure or housing 124 is affixed on and extends between the second or distal ends 123 of the respective members 121. The housing, as such, is positioned in spaced relation to the product transporting bed 80. The housing 124 defines a cavity 125, which encloses the drive assembly 120 which is seen most clearly by reference to FIG. 4. As seen in FIG. 4, the drive assembly 120 includes a pair of end plates generally designated by the numeral 130. These respective end plates are received in the cavity 125, and are supported in spaced relation relative to the product transporting bed 80 by the pair of support members 121. Each of the supporting end plates 130 has a pair of guide member apertures 131 formed therein, and still further, has a fluid passageway 132 formed therein. Extending between the pair of supporting end plates, and received within each of the guide member apertures 131, are first and second guide members 133 and 134, respectively. As illustrated, the guide members 133 and 134 are substantially tubular in shape, and provide a path of movement for the drive assembly 120. As will be seen, the first and second guide members are secured in the respective guide member apertures 131 by suitable fastening techniques. Still further, a drive tube 135 is connected in fluid flowing relation relative to the fluid passageway 132. As seen in FIG. 6, the drive tube has an internal passageway 140 which has a first end 141 and a second end 142. Still further, and as seen in FIG. 6, a drive member 143 is slidably received within the passageway 140 and is operable, under fluid pressure, (hydraulic or pneumatic) to move along the passageway 140 to selective locations. The movable drive member is fabricated from a material which is attracted to a magnet.

Referring now to FIGS. 4 and 6, the drive assembly 120 includes a magnetically coupled follower assembly 150. As illustrated, the magnetically coupled follower assembly 150 includes a housing 151 that has formed therein a pair of guide member channels 152. The guide member channels slidably receive the respective first and second guide members 133 and 134, respectively, thereby permitting the housing 151 to slidably move therealong. Still further, substantially centrally located relative to the housing 151 is a magnet 153. The magnet has an a aperture 154 formed therein. Received within the aperture 154 is a bearing 155, which is operable to slidably receive the drive tube 135 therein. In this arrangement, the magnet 153 is attracted to the drive member 143. Therefore, movement of the drive member along the passageway 140 causes the magnetically coupled follower assembly to move in substantial unison with same. Therefore, by applying selective fluid pressure to the fluid passageway 132, the magnetically coupled follower assembly 150 can be precisely positioned between the first and second ends 141 and 142 of the internal passageway.

A coupler 160 is mounted on the drive assembly 120, and is located in spaced relation above the product transporting bed 80. As noted earlier, the drive assembly 120 is operable to move in a reciprocal first path of travel discussed below. The coupler is defined by a support member 161 which is secured by fasteners 162 to the housing 151 as shown. The support member further includes a pair of spaced, depending legs 163 which define a gap or space 164 therebetween. As illustrated most clearly by reference to FIGS. 4 and 5, the coupler 160 moves in unison with the drive assembly 120, and more specifically with the magnetically coupled follower 150, along a reciprocal first path of travel 165 between a first position 166, and an opposite second position 167. Affixed to each of the depending legs of the drive assembly 120 is a deformable member generally indicated by the numeral 170. The deformable member has a first end 171, and an opposite second end 172, which are individually affixed by suitable fasteners 173 to the respective depending legs. Still further, the deformable member 170 has a mid point 174 which receives a fastener 175 therethrough. As best seen by reference to FIG. 5, it will be appreciated that the deformable member moves or is deflected in the direction of the first and second ends 81 and 82 of the product transporting bed 80, and to intermediate positions therebetween as the magnetically coupled follower 150 of the drive assembly 120 moves along the reciprocal first path of travel 165. As best seen in FIG. 4, the deformable member is affixed in force transmitting relation relative to a product engaging member which will be discussed hereinafter.

As best seen by references to FIGS. 4 and 5, the diverter assembly of the present invention 88 includes a product engaging member 190 which is mounted in force receiving relation relative to the drive assembly 120, and which is movable along a given path of travel relative to the product transporting bed 80. The movement of the product engaging member will be discussed hereinafter. The product engaging member has a main body 191 which is defined by an upwardly disposed edge 192, and an opposite downwardly disposed edge 193. As will be recognized, the downwardly disposed edge 193 is oriented in spaced relation relative to the product transporting bed 80. As seen in FIG. 5, the product engaging member has a first end 194 which has a channel portion 195 formed therein, and which is pivotally mounted on the product transporting bed 80 at a location intermediate the first and second ends 81 and 82 thereof. As shown in the drawings, while the first end is pivotally mounted substantially along the longitudinal line of reference 90, it should be recognized that this first end may be located in laterally offset relation relative to the longitudinal line of reference. As illustrated, the main body 191 also has a second end 196 which extends in the direction of the first, infeed end 81 of the product transporting bed 80. A threaded shaft 200 is affixed by suitable techniques to the supporting surface 83 of the product transporting bed 80. The threaded shaft 200 extends substantially normally upwardly relative thereto and is operable to threadably mate with a bolt 201. In this arrangement, the product engaging member 190 and more particularly the second end thereof is operable to move along an arcuately shaped path of travel, which will be discussed below. As seen in the drawings, a resilient member 202 is affixed along the downwardly disposed edge 193 and maintains contact with the product transporting bed as it reciprocates. Still further, a post or shaft 203 is mounted on the upwardly disposed edge 192 of the product engaging member 190, and is fastened to the deformable member 170 at substantially the mid-point 174 by means of a fastener. The post is operable to receive force from the deformable member which causes the main body 191 of the product engaging member 190 to move along the arcuately shaped path of travel 205.

As best illustrated by reference to the sectional view shown in FIG. 8, the main body 191 has a structural rib 204 affixed thereto to provide strength to same. The second end 196 of the product engaging member 190 is operable to move along an arcuately shaped path of travel 205 between a first position 206 and a second position 207. As best illustrated in the plan view of FIG. 5, the product transporting bed 80 has a given width dimension, and the path of travel 205 of the product engaging member 190 extends substantially across the width dimension of the product transporting bed 80. As will be appreciated, and depending upon the needs of the operator, the path of travel 205 of the product engaging member 190 may extend across only a portion of the width dimension of the product transporting bed 80. In the arrangement, as illustrated in FIG. 5, the drive assembly 120 is operable to position the product engaging member 190 in selective positions or locations along the path of travel 205 such that it substantially meters the product 86 that is delivered to the second discharge end 82 of the product transporting bed 80. Still further, the drive assembly 120 is operable to selectively position the product engaging member 190 between the first and second positions 206 and 207 such that the product engaging member provides metered access to the product ejecting aperture 91. As seen in FIG. 5, when the product engaging member is located in the first position, it substantially prohibits access to the product ejecting aperture 91, thereby directing all of the product 86 into the first channel 101. The positioning of the product engaging member is dependent upon an actuator which will be discussed in greater hereinafter.

Figure 7:
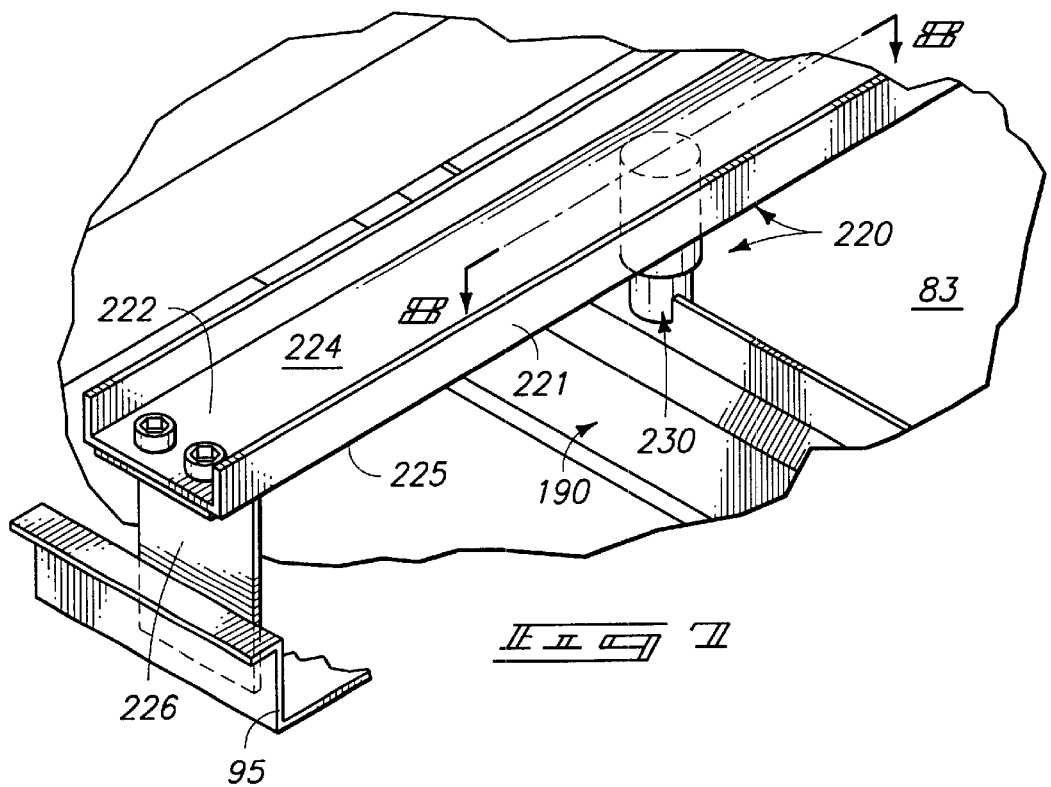
FIG. 7 is a perspective, fragmentary view of a restraining assembly utilized with the present invention.
Figure 8:
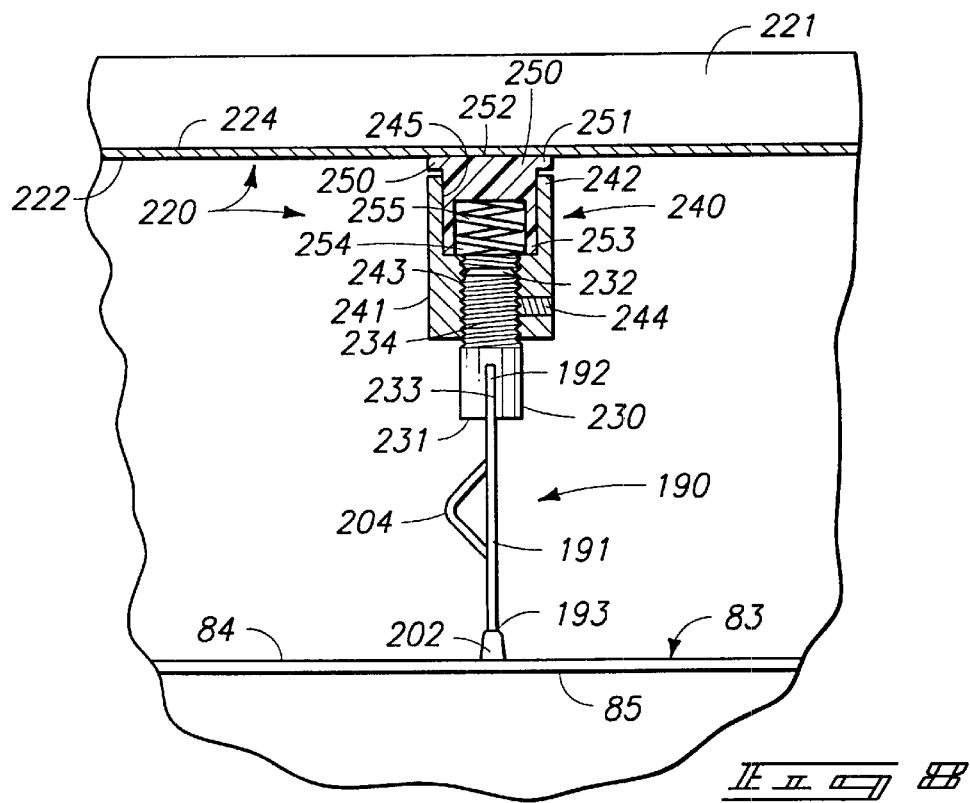
FIG. 8 is a transverse, vertical, sectional view taken through line labeled 8—8 in FIG. 7.

As best seen by reference to FIGS. 5, 7 and 8, the diverter assembly of the present invention 88 includes a restraining assembly which is generally indicated by the numeral 220. The restraining assembly includes a restraining member 221 which is disposed in spaced relation relative to the drive assembly 120 and which further is disposed in an orientation where the product engaging member 190 slidably engages same. As will be recognized from the discussion which follows, the restraining assembly 220 maintains the product engaging member 190 in a given orientation relative to the product transporting bed 80 as it reciprocally moves. As seen in FIG. 5, the restraining assembly 220 is disposed generally transversely relative to the longitudinal line of reference 90, and is disposed in predetermined substantially parallel spaced relation relative to the drive assembly 120. The restraining member 221 has a first end 222 and an opposite second end 223. Still further, it has an upwardly disposed face 224, and a downwardly disposed face 225. This is best seen in FIG. 8. As seen in FIG. 7, the restraining member 221 is held in predetermined spaced relation relative to the product transporting bed 80 by means of a pair of endwardly disposed support members 226. The endwardly disposed support members 226 are affixed on the product transporting bed 80. The restraining assembly further includes a threaded shaft 230 having opposite first and second ends 231 and 232, respectively. As seen in FIG. 8, a narrowly elongated channel 233 is formed in the first end and is operable to mate with the upwardly disposed edge 192 of the product engaging member 190. It is thereafter secured by appropriate means to the upwardly disposed edge 192. Still further, threads 234 are formed on the second end 232, and are operable to threadably mate with an engagement housing 240.

The engagement housing has opposite first and second ends 241 and 242, respectively. A threaded channel 243 is formed in the first end and thereafter threadably receives the threaded shaft 230. A set screw 244 is threadably received through the engagement housing 240 and thereby securely positions the engagement housing 240 in a given location along the second end 232 of the threaded shaft 230. As will be recognized by a study of FIG. 8, a cavity 245 is formed in the second end 242 of the engagement housing 240. An engagement cap 250 which is fabricated from a synthetic material which will slide easily along the downwardly disposed face 225 of the restraining member 221, is shown. The engagement cap has a first end 251 having an engagement surface 252 which rests in contact against the restraining member 221, and an opposite second end 253. A channel 254 is formed in the second end 253 and a biasing spring 255 is received in the channels 254 and 245 respectively. The biasing spring is operable to bias the engagement cap in the direction of the restraining member and thereby resiliently support the product engaging member 190 in contact with the underlying product transporting bed 80. This is best seen in FIG. 8. The restraining assembly permits the resilient member 202 borne on the product engagement member 190 to remain in contact with the underlying product transporting bed 80 as the product transporting bed 80 moves in response to the vibratory drive 50.

Figure 9:
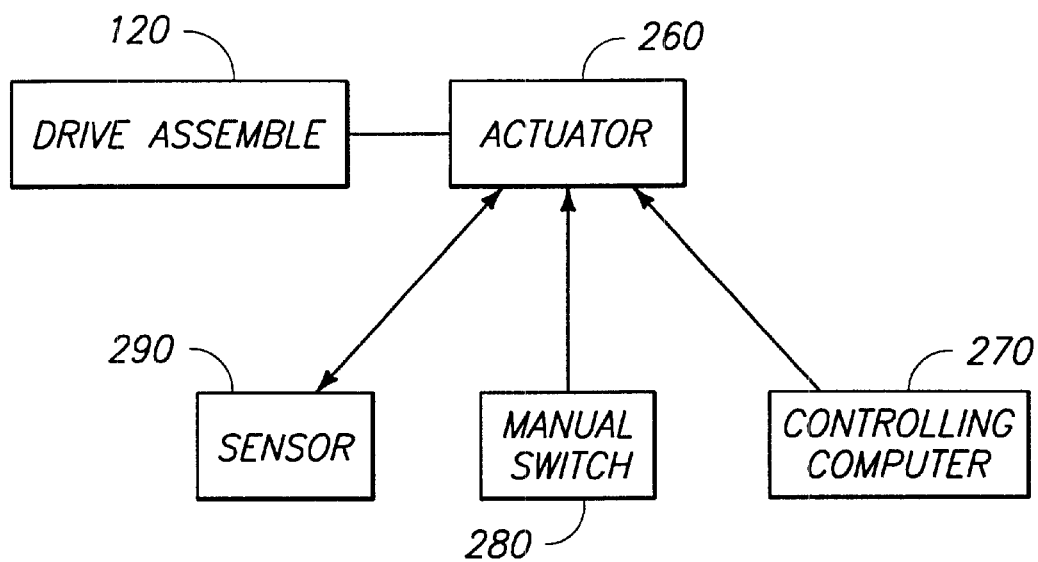
FIG. 9 is a greatly simplified, schematic diagram showing the control system utilized with the present invention.

Referring now to FIG. 9, it will be seen that the drive assembly is responsive to an actuator 260. This actuator, depending upon the type of drive assembly used, may include both hydraulic, and pneumatic actuators. Still further, the actuator 260 may also be coupled in signal responsive relationship responsive to other assemblies such as a controlling computer 270; a manual switch 280; or an upstream or downstream process sensor. As illustrated in FIG. 9, the actuator is coupled in signal controlling relation relative to the drive assembly 120. The controlling computer may also control a number of other processing devices, both upstream and downstream of the diverter assembly 88. It should be understood that the diverter assembly 88 of the present invention may be utilized in other forms apart from that which is shown. For example, several diverter assemblies may be positioned in a staggered arrangement along the length of a product transporting bed 80. Yet further, in this arrangement, multiple product ejecting apertures 91 in various locations may be employed with same. Moveover, it is possible that a pair of diverter assemblies may be deployed in a side-by-side arrangement when relatively wide product transporting beds are utilized.

OPERATION

The operation of the described embodiment of the present invention is believed to be readily apparent, and is briefly summarized at this point.

As best seen by reference to the drawings, the diverter assembly 88 of the present invention 80 is operable for use with a vibratory conveyor 10 and which comprises a product transporting bed 80 having a first infeed end 81, and a second discharge end 82. The product transporting bed is operable to repeatedly move in a forward and upward direction to convey a product 86 supported on the transporting bed from the infeed end 81 to the discharge end 82 thereof. The product transporting bed 80 has a longitudinal line of reference 90 which extends between the first and second ends 81 and 82 thereof. The product transporting bed further defines a product ejecting aperture 91 which is located intermediate the first and second ends 81 and 82.

A drive assembly 120 is mounted in spaced relation above the product transporting bed 80. The drive assembly moves in a reciprocal first path of travel 165, and is further mounted substantially transversely relative to the longitudinal line of reference 90. The drive assembly further is disposed intermediate the first and second ends 81 and 82 of the product transporting bed 80. A coupler 160 is mounted on the drive assembly 120 and depends downwardly therefrom. The coupler 160 moves in substantial unison with the drive assembly 120. The coupler 160 includes a support member 161 having a pair of spaced depending legs 163. Yet further, the coupler has a deformable member 170 which is mounted on and extends between the pair of spaced depending legs.

A product engaging member 190 having opposite first and second ends 194 and 196 respectively is disposed in force receiving relation relative to the deformable member 170 which is borne by the coupler 160. The first end of the product engaging member 194 is pivotally mounted on the product transporting bed 80, and the second end 196, under the influence of the drive assembly 120 moves along an arcuately shaped path of travel 205 over the product transporting bed 80. The arcuately shaped path of travel 205 of the product engaging member 190 is defined between a first position 206 and a second position 207. The product engaging member 190, when located in the first position, substantially prohibits access to the product ejecting aperture 91.

A restraining assembly 220 is position over and in spaced relation relative to the product transporting bed 80. Still further, the restraining assembly is disposed in spaced relation relative to the drive assembly 120 and intermediate the drive assembly 120 and the first end 81 of the product transporting bed 80. The product engaging members 190 slidably rests in contact with the restraining assembly 221. The restraining assembly substantially supports the product engaging member in a given position relative to the product transporting bed 80 as it reciprocally moves between the first and second positions along the arcuately shaped path of travel. An actuator 260 is coupled in controlling relation relative to the drive assembly 120 for selectively locating the product engaging member along the second arcuately shaped path of travel 205.

Therefore, it will be seen that the diverter assembly of the present invention provides a convenient means whereby an operator of a conventional excited frame vibratory conveyer may optimize the performance of same, and allow it further to be utilized in combination with various other controlling devices, and other processing equipment, both upstream and downstream of same, such that the efficiency and usefulness of these assemblies may be coordinated and substantially enhanced.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A diverter assembly for use with a vibratory conveyor having a product transporting bed comprising:
    a conveyor frame positioned in spaced relation relative to the product transporting bed;
    a drive assembly borne by the frame;
    a product engaging member mounted in force receiving relation relative to the drive assembly and moveable along a given path of travel relative to the product transporting bed; and
    coupler mounted on the drive assembly and disposed in force transmitting relation relative to the product engaging member, and wherein the coupler has a deformable member which is mounted on the product engaging member.

2. A diverter assembly as claimed in claim 1, wherein the product engaging member has a main body which defines an upwardly disposed edge, and a lowermost edge, and wherein the lowermost edge is disposed in spaced relation relative to the product transporting bed, and wherein a resilient member is mounted on the lowermost edge and rests in contact with the product engaging bed.

3. A diverter assembly as claimed in claim 1, and further comprising:
    a restraining assembly positioned in spaced relation relative to the product transporting bed, and which is further disposed in spaced relation relative to the drive assembly, the product engaging member disposed in sliding engagement with the restraining member, and wherein the restraining member maintains the product engaging member in a given orientation relative to the product transporting bed.

4. A diverter assembly as claimed in claim 3, wherein the product engaging member has a first and second end, and the drive assembly is disposed in force transmitting relation relative to the product engaging member at a location intermediate the first and second ends, and wherein the path of travel is arcuately shaped, and the second end moves along the path of travel, and wherein the restraining assembly rests in contact with the product engaging member at a location which is intermediate the second end and the location where the drive assembly engages the product engaging member.

5. A diverter assembly as claimed in claim 3, wherein the product transporting bed has a first infeed end, an opposite discharge end and a longitudinal line of reference which extends between the infeed and discharge ends, and wherein the drive assembly is reciprocally moveable along a path of travel, and wherein the path of travel of the drive assembly, and the restraining assembly are substantially transversely oriented relative to the longitudinal line of reference of the product transporting bed.

6. A diverter assembly as claimed in claim 3, wherein the restraining assembly further comprises:
    a shaft having an end portion mounted in a fixed location on the product engaging member;
    an engagement housing defining a cavity and which is mounted on the end portion of the shaft;
    a biasing spring received in the cavity defined by the engagement housing;
    an engagement cap matingly cooperating with the engagement housing, and wherein the biasing spring acts upon the engagement cap to urge the biasing cap to move in a given direction; and
    a restraining member positioned over and in spaced relation relative to the product transporting bed, and wherein the engagement cap is biased against, and slides in contact with ,the restraining member and substantially supports the product engaging member in a given position relative to the product transporting bed.

7. A diverter assembly as claimed in claim 3, wherein the product transporting bed has a first infeed end, and a second discharge end, and a longitudinal line of reference extends between the infeed and discharge ends, and wherein the product engaging member has opposite first and second ends, and wherein the first end is pivotally mounted on the product transporting bed and substantially along the longitudinal line of reference thereof, and wherein the second end extends in the direction of the first infeed end of the product transporting bed.

8. A diverter assembly as claimed in claim 3, wherein the product transporting bed has a first infeed end and a second discharge end, and a longitudinal line of reference extends between the infeed and discharge ends, and wherein the product engaging member has opposite first and second ends, and wherein the first end is pivotally mounted on the product transporting bed and located in laterally offset relation relative to the longitudinal line of reference thereof, and wherein the second end extends in the direction of the first infeed end of the product transporting bed.

9. A diverter assembly as claimed in claim 3, wherein the product transporting bed has a width dimension, and wherein the path of travel of the product engaging member extends substantially across the width dimension of the product transporting bed.

10. A diverter assembly as claimed in claim 3, wherein the product transporting bed has a width dimension, and wherein the path of travel of the product engaging member extends across only a portion of the width dimension of the product transporting bed.

11. A diverter assembly as claimed in claim 7, wherein the product transporting bed has a product ejecting aperture formed therein, and wherein the path of travel of the product engaging member is defined between a first position, and a second position, and wherein the product engaging member when located in the first position substantially prohibits access to the product ejecting aperture.

12. A diverter assembly as claimed in claim 7, wherein a product is transported on the product transporting bed between the first infeed end, and the second discharge end, and wherein the path of travel of the product engaging member is defined between a first position, and a second position, and wherein the product engaging member when located in selective positions along the path of travel substantially meters the product to the second discharge end.

13. A diverter assembly as claimed in claim 11, wherein the drive assembly is operable to selectively position the product engaging member between the first and second positions which define the path of travel thereof, and wherein the selective positioning of the product engaging member between the first and second positions provides metered access to the product ejecting aperture.

14. A diverter assembly as claimed in claim 3, wherein the drive assembly comprises a fluid driven magnetically coupled drive which, when actuated causes the product engaging member to move to a given position along the path travel thereof, and wherein the diverter assembly further comprises an actuator coupled in signal controlling relation relative to the magnetic drive, and wherein little vibrational force is transmitted to the fluid driven magnetically coupled drive.

15. A diverter assembly as claimed in claim 14, wherein the actuator is responsive to a sorting signal produced by a sensor.

16. A diverter assembly as claimed in claim 14, wherein the actuator is responsive to a feedback signal produced by a process sensor.

17. A diverter assembly as claimed in claim 14, wherein the drive assembly is actuated manually, electrically, hydraulically, and pneumatically.

18. A diverter assembly as claimed in claim 14, wherein the product transporting bed has a first infeed end and an opposite discharge end, and wherein multiple diverter assemblies are located between the infeed and the discharge ends.

19. A diverter assembly for use with a vibratory conveyor, comprising:
- a product transporting bed having a first infeed end and a second discharge end, and wherein the product transporting bed has a longitudinal line of reference which extends between the first and second ends thereof, and further defines a product ejecting aperture which is located intermediate the first and second ends, and wherein the product transporting bed repeatedly moves in a forward and upward direction to convey a product supported on the product transporting bed from the infeed end to the discharge end thereof;
- a drive assembly positioned in spaced relation above the product transporting bed, the drive assembly moving in a reciprocal first path of travel;
- a coupler mounted on the drive assembly and descending downwardly therefrom, the coupler moving in substantial unison with the drive assembly; and
- a product engaging member having opposite first and second ends, and which is disposed in force receiving relation relative to the coupler, and wherein the first end of the product engaging member is pivotally mounted on the product transporting bed, and the second end, under the influence of the drive assembly moves along an arcuately shaped second path of travel over the product transporting bed.

20. A diverter assembly as claimed in claim 19, wherein the drive assembly is mounted substantially transversely relative to the longitudinal line of reference, and intermediate the first and second ends of the product transporting bed.

21. A diverter assembly as claimed in claim 20, wherein the coupler includes a support member having a pair or spaced, depending legs, and wherein the coupler further has a deformable member which is mounted on and extends between the pair of spaced, depending legs, and wherein the deformable member is mounted on the product engaging member.

22. A diverter assembly as claimed in claim 21, wherein the first end of the product engaging member is pivotally mounted on the product transporting bed at a location between the drive assembly and the second end of the product transporting bed, and wherein the product engaging member has a main body which defines an upwardly disposed edge, and a lowermost edge, and wherein the lowermost edge is disposed in spaced relation relative to the product transporting bed, and wherein a resilient member is mounted on the lowermost edge and rests in contact with the product engaging bed.

23. A diverter assembly as claimed in claim 22, wherein the arcuately shaped path of travel of the product engaging member is defined between a first position and a second position, and wherein the product engaging member when located in the first position substantially prohibits access to product ejecting aperture.

24. A diverter assembly as claimed in claim 23, wherein the product transporting bed has a width dimension, and wherein the path of travel of the product engaging member extends substantially across the width dimension of the product transporting bed.

25. A diverter assembly as claimed in claim 23, wherein the product transporting bed has a width dimension, and wherein the path of travel of the product engaging member extends across only a portion of the width dimension of the product transporting bed.

26. A diverter assembly as claimed in claim 23, wherein the drive assembly operates to selectively position the product engaging member between the first and second positions along the arcuately shaped path of travel, and wherein the selective positioning of the product engaging member between the first and second positions provides metered access to the product engaging aperture.

27. A diverter assembly as claimed in claim 23, wherein a product is transported on the product transporting bed between the first infeed end, and the second discharge end, and wherein the path of travel of the product engaging member is defined between a first position, and a second position, and wherein the product engaging member when located in selective positions along the path of travel substantially meters the product to the second discharge end.

28. A diverter assembly as claimed in claim 26, and further comprising:
- a restraining assembly positioned over and in spaced relation relative to the product transporting bed, and further disposed in spaced relation relative to the drive assembly, and intermediate the drive assembly and the first end of the product transporting bed, and wherein the product engaging member slideably rests in contact with the restraining assembly, and wherein the restraining assembly substantially supports the product engaging member in a given position relative to the product transporting bed as it reciprocally moves between the first and second positions along the arcuately shaped second path of travel.

29. A diverter assembly as claimed in claim 28, wherein the restraining assembly further comprises:
- a shaft having an end portion mounted in a fixed location on the upwardly disposed edge of the product engaging member;
- an engagement housing defining a cavity and which is mounted on the end portion of the shaft;
- a biasing spring received in the cavity defined by the engagement housing;
- an engagement cap matingly cooperating with the engagement housing, and wherein the biasing spring acts upon the engagement cap to urge the biasing cap to move in a given direction; and
- a restraining member substantially transversely positioned over and in spaced relation relative to the product transporting bed, and wherein the engagement cap is biased against, and slides in contact with the restraining member and substantially supports the product engaging member in a given position relative to the product transporting bed.

30. A diverter assembly as claimed in claim 29, wherein the drive assembly comprises a fluid driven magnetically coupled drive which, when actuated causes the product engaging member to move to a given position along the first path travel, and wherein the diverter assembly further comprises an actuator coupled in controlling relation relative to the magnetically coupled drive; and wherein the product transporting bed has a given mass, and the drive assembly does not substantially increase the mass of the product transporting bed.

31. A diverter assembly as claimed in claim 30, wherein the actuator is responsive to a sorting signal produced by a sensor.

32. A diverter assembly as claimed in claim 30, wherein the actuator is responsive to a feedback signal produced by a process sensor.

33. A diverter assembly as claimed in claim 30, wherein the drive assembly is actuated manually, electrically, hydraulically, and pneumatically.

34. A diverter assembly as claimed in claim 30, wherein the product transporting bed has a first infeed end and an opposite discharge end, and wherein multiple diverter assemblies are located between the infeed and the discharge ends.

35. A diverter assembly for use with a vibratory conveyor comprising:

a product transporting bed having a first infeed end and a second discharge end, and wherein the product transporting bed repeatedly moves in a forward and upward direction to convey a product supported on the product transporting bed from the infeed end to the discharge end thereof, and wherein the product transporting bed has a longitudinal line of reference which extends between the first and second ends thereof, and wherein the product transporting bed further defines a product ejecting aperture which is located intermediate the first and second ends;

a drive assembly mounted in spaced relation above the product transporting bed, the drive assembly moving in a reciprocal first path of travel, and wherein the drive assembly is mounted substantially transversely relative to the longitudinal line of reference, and intermediate the first and second ends of the product transporting bed;

a coupler mounted on the drive assembly and depending downwardly therefrom, the coupler moving in substantial unison with the drive assembly, and wherein the coupler includes a support member having a pair or spaced, depending legs, and wherein the coupler further has a deformable member which is mounted on and extends between the pair of spaced, depending legs;

a product engaging member having opposite first and second ends and which is disposed in force receiving relation relative to the deformable member which is borne by the coupler, and wherein the first end of the product engaging member is pivotally mounted on the product transporting bed, and the second end, under the influence of the drive assembly, moves along an arcuately shaped second path of travel over the product transporting bed, and wherein the arcuately shaped path of travel of the product engaging member is defined between a first position and a second position, and wherein the product engaging member when located in the first position substantially prohibits access to product ejecting aperture;

a restraining assembly positioned over and in spaced relation relative to the product transporting bed, and further disposed in spaced relation relative to the drive assembly, and intermediate the drive assembly and the first end of the product transporting bed, and wherein the product engaging member slidable rests in contact with the restraining assembly, and wherein the restraining assembly substantially supports the product engaging member in a given position relative to the product transporting bed as it reciprocally moves between the first and second positions along the arcuately shaped second path of travel; and an actuator coupled in controlling relation relative to the drive assembly for selectively locating the product engaging member along the second arcuately shaped path of travel.

36. A diverter assembly as claimed in claim 35, wherein the product engaging member has a main body which defines an upwardly disposed edge, and a lowermost edge, and wherein the deformable member is disposed in force transmitting relation relative to the upwardly dispose edge, and wherein the lowermost edge is disposed in spaced relation relative to the product transporting bed, and wherein a resilient member is mounted on the lowermost edge and rests in contact with the product transporting bed.

37. A diverter assembly as claimed in claim 36, wherein the restraining assembly further comprises:

a shaft having an end portion mounted in a fixed location on the upwardly disposed edge of the product engaging member;

an engagement housing defining a cavity and which is mounted on the end portion of the shaft;

a biasing spring received in the cavity defined by the engagement housing;

an engagement cap matingly cooperating with the engagement housing, and wherein the biasing spring acts upon the engagement cap to urge the biasing cap to move in a given direction; and a restraining member substantially transversely positioned over and in spaced relation relative to the product transporting bed, and wherein the engagement cap is biased against, and slides in contact with the restraining member and substantially supports the product engaging member in a given position relative to the product transporting bed.

\* \* \* \* \*